US011151771B1

(12) United States Patent
Davies

(10) Patent No.: US 11,151,771 B1
(45) Date of Patent: Oct. 19, 2021

(54) IMAGE DATA PROCESSING METHOD AND APPARATUS

(71) Applicant: CANON MEDICAL SYSTEMS CORPORATION, Otawara (JP)

(72) Inventor: Ross Davies, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 0 days.

(21) Appl. No.: 16/868,859

(22) Filed: May 7, 2020

(51) Int. Cl.
*G06T 15/00* (2011.01)
*G06T 15/08* (2011.01)
*G06T 17/20* (2006.01)
*G06T 15/06* (2011.01)

(52) U.S. Cl.
CPC .............. *G06T 15/08* (2013.01); *G06T 17/20* (2013.01); *G06T 15/06* (2013.01)

(58) Field of Classification Search
CPC .......... G06T 15/06; G06T 15/08; G06T 17/20
See application file for complete search history.

(56) References Cited

U.S. PATENT DOCUMENTS

| 6,559,843 | B1 | 5/2003 | Hsu |
| 7,598,952 | B1 | 10/2009 | O'Donnell |
| 8,493,383 | B1* | 7/2013 | Cook ............... G06T 15/06 345/419 |
| 2006/0256111 | A1 | 11/2006 | Chihoub et al. |
| 2016/0292913 | A1* | 10/2016 | Wahrenberg ........... A61B 8/483 |
| 2018/0144539 | A1 | 5/2018 | Kredi et al. |

OTHER PUBLICATIONS

Marco Salvi et al., Adaptive transparency, HPG '11: Proceedings of the ACM SIGGRAPH Symposium on High Performance Graphics, Aug. 2011, pp. 119-126.
Marco Salvi, Adaptive Transparency (presentation), Game Developers Conference 2011, Feb. 28 to Mar. 4, 2011, Moscone Center, San Francisco, 34 pages.

* cited by examiner

*Primary Examiner* — Charles Tseng
(74) *Attorney, Agent, or Firm* — Oblon, McClelland, Maier & Neustadt, L.L.P.

(57) ABSTRACT

A medical image processing apparatus comprises a buffer; and processing circuitry configured to: obtain a volumetric image data set; determine, from the volumetric image data set, a plurality of intervals along a path through the volumetric image data set, each interval having a respective depth from a reference position of the path; for each of the plurality of intervals, determine respective parameter values of a respective continuous function representative of a transparency of the interval; store the parameter values for the continuous functions to the buffer; and generate a rendered image using the stored parameter values for the continuous functions.

20 Claims, 9 Drawing Sheets

IMAGE DATA PROCESSING METHOD AND APPARATUS

FIELD

Embodiments described herein relate generally to an apparatus and method for image data processing, for example processing image data using an interval-based A-buffer.

BACKGROUND

Structural fusion involves rendering two or more sets of volumetric data simultaneously into the same conceptual space. FIG. 1 is a flow chart illustrating in overview a traditional fusion method for rendering an image from multiple volumetric data sets. At stage 10, processing circuitry performing the fusion begins the rendering process. At stage 20, the processing circuitry performs a respective ray-casting process for each pixel of the image to be rendered.

The ray-casting process of stage 20 comprises stages 22 to 34 of FIG. 1 as described below. At stage 22, the processing circuitry begins casting a ray. Stages 24 and 26 are performed for each of the volumetric data sets synchronously. At stage 24 the processing circuitry steps to the position of the next sample point on the ray. At stage 26, the processing circuitry samples the volumetric data set at the sample position.

At stage 28, the processing circuitry combines volume sample values for all of the volumetric data sets to obtain a combined sample value for the sample point. At stage 30, the processing circuitry composites the combined sample value with the value obtained from any preceding samples on the same ray.

At stage 32, the processing circuitry asks whether the ray is finished. If the ray is not finished, the flow chart of FIG. 1 returns to stage 24 and steps to a next sample position on the ray. If the ray is finished at stage 32, the processing circuitry proceeds to stage 34 at which it writes a pixel value for a pixel corresponding to the ray. Stage 34 concludes the ray-casting process of stage 20.

Stage 20 is performed for each pixel of the image to be rendered. Stage 20 may be performed simultaneously for all of the pixels in the image, or may be performed sequentially for each pixel. Once stage 20 has been performed for all pixels, the render is complete and the flow chart of FIG. 1 finishes at stage 40.

Traversing all volumes of a structural fusion case simultaneously may have extremely harsh requirements. Sampling is performed from all volumes at each step, which increases memory bandwidth requirements significantly when compared to sampling of a single volume. An access pattern is spread across multiple independent volumes. Increased data requirements impact cache performance. A larger working set is needed to account for volume-specific local state during render.

In ray-casting rendering methods, rendering an individual pixel involves alpha compositing together a number of pixel fragments. Compositing fragments into a final value is done using the over operator or under operator. An alpha compositing operator must be applied to a depth ordered set of fragments. Compositing out of order is likely to yield obviously incorrect results.

It has been proposed to provide deferred compositing using an A-buffer. In such deferred composition methods, pixel fragments are stored in an A-buffer during render time. A second pass then sorts and composites the fragments into a final pixel value.

Basic A-buffers have unbounded memory requirements. Basic A-buffers store all pixel fragments. In the case of a large volumetric data set, storing all pixel fragments may require many GB of storage. In general, enough space to store all pixel fragments may not be available, especially when rendering on GPU.

A-buffers may be designed primarily for use with polygonal geometry. Fragment entries in A-buffers may be point samples. The use of point samples may lead to a transmittance function that comprises a series of steps as the ray is traversed. FIG. 2 illustrates an example of a transmittance function 45. In FIG. 2, transmittance is plotted against a distance from a viewer, which may also be referred to as a depth. The transmittance function 45 comprises a series of steps between discrete transmittance values.

A GPU-targeted modification of A-buffers is Adaptive Transparency (Marco Salvi, Jefferson Montgomery, Aaron E Lefohn, Adaptive transparency, HPG '11: Proceedings of the ACM SIGGRAPH Symposium on High Performance Graphics, August 2011, Pages 119-126). Adaptive Transparency uses a size-limited linked-list to store pixel fragments. A composite-in-place scheme is used to free up additional space when a new fragment is added.

As fragments are composited, their influence moves gradually forwards through the ray. This may result in errors due to samples being composited out of order.

BRIEF DESCRIPTION OF THE DRAWINGS

Embodiments are now described, by way of non-limiting example, and are illustrated in the following figures, in which.

DETAILED DESCRIPTION

Certain embodiments provide a medical image processing apparatus comprising: a buffer; and processing circuitry configured to: obtain a volumetric image data set; determine, from the volumetric image data set, a plurality of intervals along a path through the volumetric image data set, each interval having a respective depth from a reference position of the path; for each of the plurality of intervals, determine respective parameter values of a respective continuous function representative of a transparency of the interval; store the parameter values for the continuous functions to the buffer; and generate a rendered image using the stored parameter values for the continuous functions.

Certain embodiments provide a medical image processing method comprising: obtaining a volumetric image data set; determining, from the volumetric image data set, a plurality of intervals along a path through the volumetric image data set, each interval having a respective depth from a reference position of the path; for each of the plurality of intervals, determining respective parameter values of a respective continuous function representative of a transparency of the interval; storing the parameter values for the continuous functions to a buffer; and generating a rendered image using the stored parameter values for the continuous functions.

Figure 1:
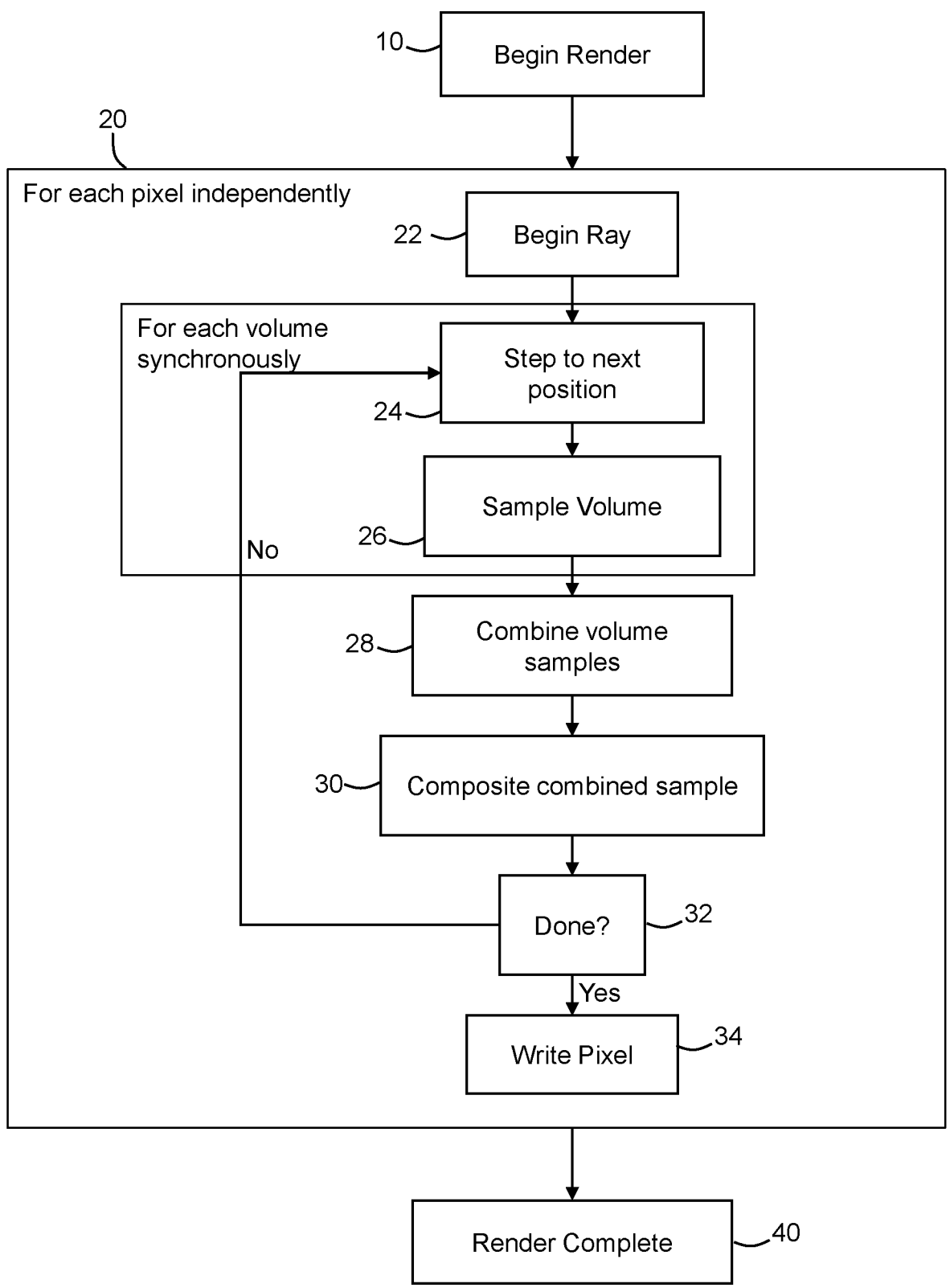
FIG. 1 is a flow chart illustrating in overview a traditional rendering method.
Figure 2:
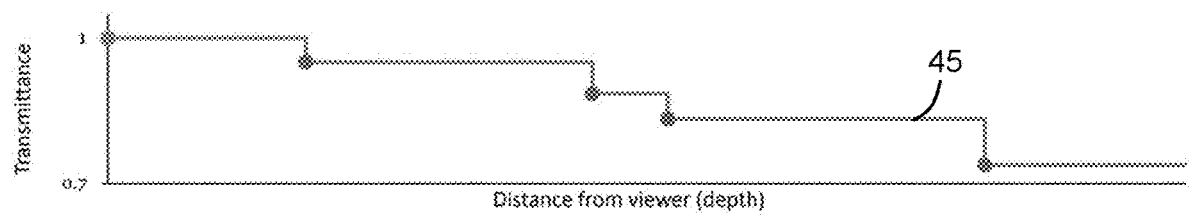
FIG. 2 is an example of a transmittance function comprising a plurality of steps.
Figure 3:
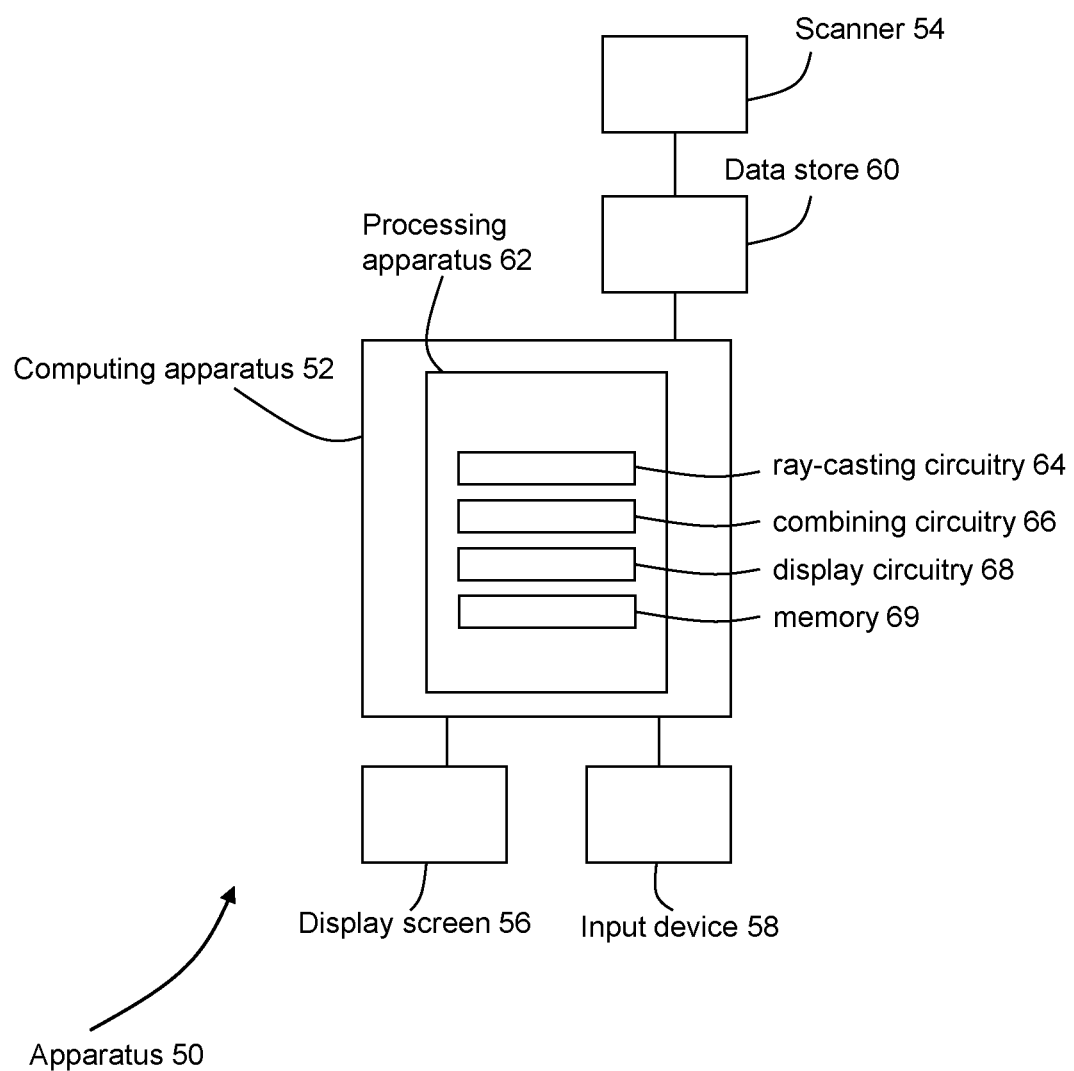
FIG. 3 is a schematic diagram of an apparatus according to an embodiment.

A medical image processing apparatus 50 according to an embodiment is illustrated schematically in FIG. 3. The medical image processing apparatus 50 comprises a computing apparatus 52, in this case a personal computer (PC) or workstation, which is connected to a scanner 54 via a data store 60.

The medical image processing apparatus 50 further comprises one or more display screens 56 and an input device or devices 58, such as a computer keyboard, mouse or trackball.

In the present embodiment, the scanner 54 is a CT (computed tomography) scanner which is configured to obtain volumetric CT scans. In other embodiments, the scanner 54 may be any scanner that is configured to perform medical imaging. The scanner 54 is configured to generate image data that is representative of at least one anatomical region of a patient or other subject.

The scanner 54 may be configured to obtain two-, three- or four-dimensional image data in any imaging modality. For example, the scanner 54 may comprise a magnetic resonance (MR) scanner, computed tomography (CT) scanner, cone-beam CT scanner, positron emission tomography (PET) scanner, X-ray scanner, or ultrasound scanner.

In the present embodiment, image data sets obtained by the scanner 54 are stored in data store 60 and subsequently provided to computing apparatus 52. In an alternative embodiment, image data sets are supplied from a remote data store (not shown). The data store 60 or remote data store may comprise any suitable form of memory storage. In some embodiments, the medical image processing apparatus 50 is not coupled to any scanner.

Computing apparatus 52 comprises a processing apparatus 62 for processing of data.

The processing apparatus comprises a central processing unit (CPU) and Graphical Processing Unit (GPU). The processing apparatus 62 provides a processing resource for automatically or semi-automatically processing medical image data sets. In other embodiments, the data to be processed may comprise any image data, which may not be medical image data.

The processing apparatus 62 includes ray-casting circuitry 64, combining circuitry 66, and display circuitry 68. The processing apparatus 62 further comprises a memory 69.

In the present embodiment, the circuitries 64, 66, 68 and memory 69 are each implemented in the CPU and/or GPU by means of a computer program having computer-readable instructions that are executable to perform the method of the embodiment. In other embodiments, the various circuitries may be implemented as one or more ASICs (application specific integrated circuits) or FPGAs (field programmable gate arrays).

The computing apparatus 52 also includes a hard drive and other components of a PC including RAM, ROM, a data bus, an operating system including various device drivers, and hardware devices including a graphics card. Such components are not shown in FIG. 3 for clarity.

Figure 4:
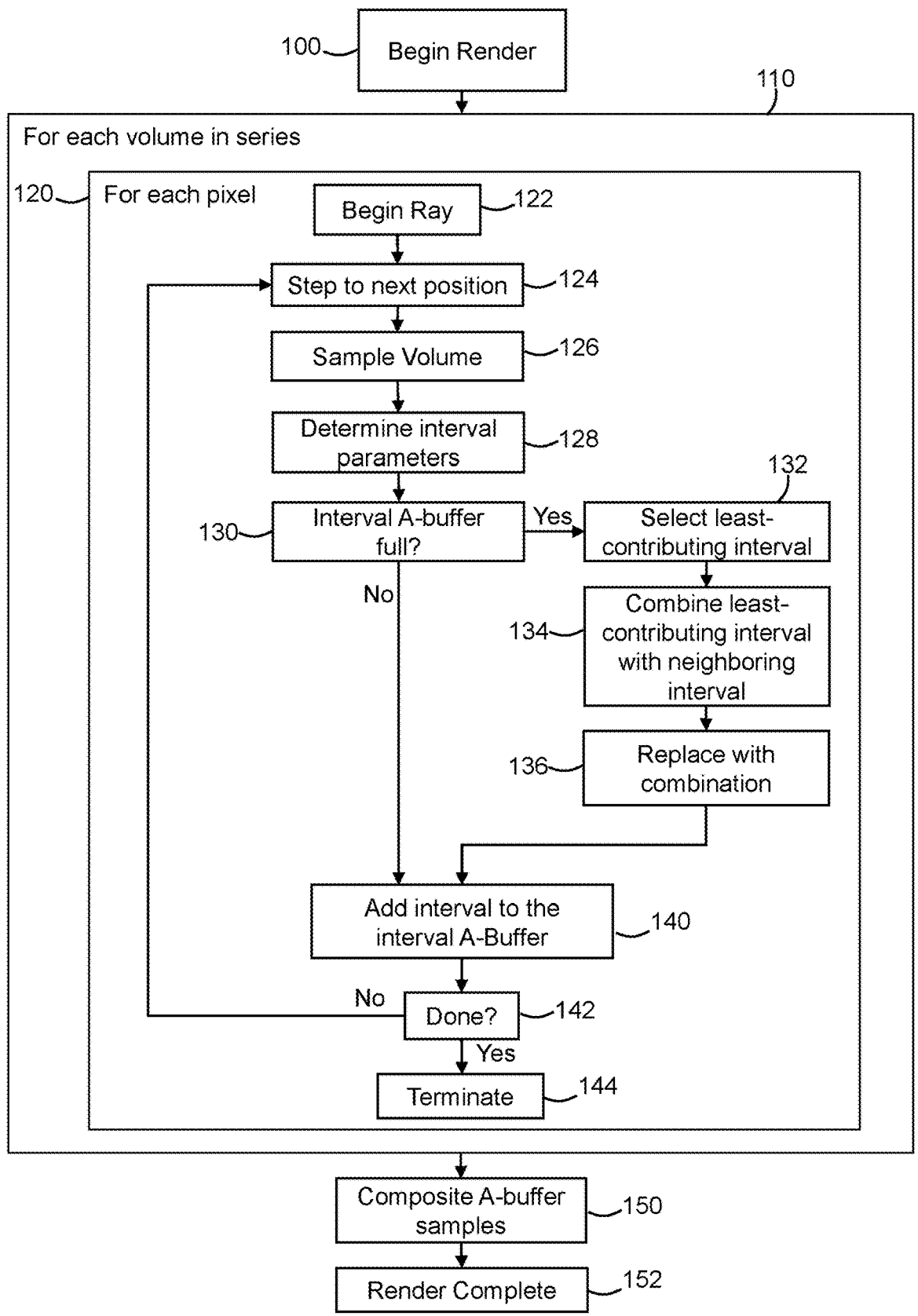
FIG. 4 is a flow chart illustrating in overview a method of an embodiment.

The apparatus of FIG. 3 is configured to perform a method of processing medical image data as illustrated in FIG. 4. In other embodiments, the apparatus of FIG. 3 may be configured to process any suitable image data, which may not be medical.

FIG. 4 is a flow chart illustrating in overview a fusion rendering method in which intervals are stored in an A-buffer. In the embodiment described below, fusion is performed on two volumetric CT data sets. For example, a first one of the volumetric data sets may comprise non-contrast CT data, and a second one of the volumetric data sets may comprise contrast CT data.

In other embodiments, the method of FIG. 4 may be used to perform fusion on any suitable volumetric data sets, for example volumetric data sets representative of the same anatomical region that have been acquired in different modalities. The method of FIG. 4 may be used to perform fusion on any number of volumetric data sets. For example, fusion may be performed on three, four or five volumetric data sets.

In the method of FIG. 4, a ray-casting process is performed for each volumetric data set in series. The ray-casting process does not step through all the volumetric data sets at once. By moving the synchronous per-volume section out of the ray logic, renderer complexity may be greatly reduced.

At stage 100, the rendering process begins. In the present embodiment, the rendering process comprises shaded volume rendering. In other embodiments, the rendering process comprises global illumination rendering. In further embodiments, any suitable rendering method may be used that comprises ray-casting.

The rendering process proceeds to stage 110. Stage 110 is performed for each volumetric data set individually, in series. In the present embodiment, stage 110 is first performed for the first volumetric data set, which is a non-contrast CT data set.

Stage 110 comprises multiple instances of stage 120. A respective instance of stage 120 is performed for each pixel of the image to be rendered. Stage 120 comprises a ray-casting process in which intervals are stored in an interval A-buffer in memory 69 for deferred compositing. The interval A-buffer may also be referred to as a deferred composition buffer or DCB. The interval A-buffer has a fixed length. For example, the interval A-buffer may be configured to store 4 intervals, 8 intervals, 16 intervals or 32 intervals. The interval A-buffer may be configured to store 5 intervals, 10 intervals, 20 intervals or 30 intervals.

At stage 122, the ray-casting circuitry 64 begins casting a ray. The ray-casting circuitry 64 determines a first sample point having a depth of 0 and an opacity of 0 (or transparency of 1). Opacity may also be referred to as alpha. The ray-casting circuitry 64 obtains a color for the first sample point. The color comprises values for R, G and B. Colors for sample points may be obtained using any conventional sampling method.

The ray-casting circuitry 64 proceeds to stage 124. At stage 124, the ray-casting circuitry 64 steps to the position of a next sample point on the ray. Any suitable ray step distance between sample points may be used. For example, the next sample point may have a depth of 1. At stage 126, the ray-casting circuitry 64 samples the first volumetric data set at the sample point. Only one volumetric data set is sampled. The ray-casting circuitry 64 obtains a color (RGB) and opacity for the sample point. The color and opacity for the sample point may be obtained using any conventional sampling method. The opacity of the sample point is an approximation of the total accumulated opacity over the entire step between the preceding sample point and the current sample point. This is because an opacity curve used is modified to account for the ray step distance. In other embodiment, pre-integrated opacity curves may be used. In the case of pre-integrated opacity curves, an opacity sampled by the ray-casting circuitry 64 is a definite integral between the preceding sample point and the current sample point.

At stage 128, the ray-casting circuitry 64 determines interval parameters for an interval between the sample point and the preceding sample point. The interval parameters are based on the sample values for the sample point and the sample values for the preceding sample point. The interval parameters may also be referred to as image-related parameters. In the present embodiment, the values for the parameters include values for R, G, B and opacity. The parameters also include a depth of the point at which the interval starts (for example, 0) and a width of the interval (for example, 1). The width of the interval may also be referred to as a depth extent of the interval.

In the present embodiment, an interval between a preceding sample point and a current sample point is modelled as a continuous function having an exponential fall-off. It may be considered that the continuous function is fitted to the sample points.

In the present embodiment, color (RBG) is considered to be constant across the interval. A value for opacity is also constant across the interval, which causes accumulated opacity to vary in a predetermined fashion. In other embodiments, color and/or opacity may be considered to vary across the interval in a predetermined fashion.

An accumulated opacity across an interval having opacity $\alpha_s$ over a step between samples of $\delta_s$ is modelled by the equation:

$$\alpha_{acc}(u) = \frac{(1-\alpha_s \cdot c)^{u/\delta_s}}{c} \quad \text{(Equation 1)}$$

where u is the distance through the interval over which the accumulated opacity is to be measured and $\alpha_{acc}$ is the opacity accumulated over the sub-interval specified by u. c is a sharpness constant which is included to avoid the equation breaking down when $\alpha_s=1$. c has a value of 0.999. In other embodiments, c may have any value as long as c is close to 1, but is not exactly 1.

In the present embodiment, the RGB values for an interval from a preceding sample point and a current sample point are taken to be the RGB values of the sample point. In other embodiments, any suitable color values may be used to determine color for the interval. For example, color at the start, end, middle and/or centroid of the interval may be used.

Figure 5:
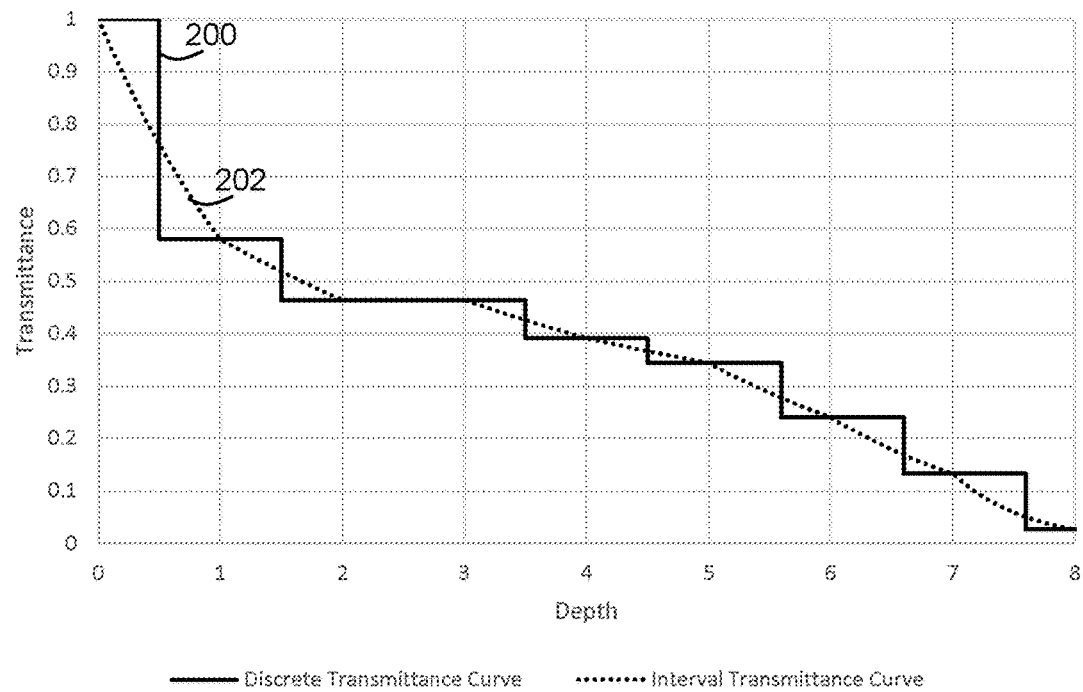
FIG. 5 is a plot of transmittance versus depth, showing intervals modelled as having an exponential fall-off in accordance with an embodiment.

FIG. 5 is a plot of transmittance versus depth. Transmittance may be considered to be an amount of energy still present in a ray at a given point along the ray, after the energy has been attenuated by all of the material that the ray has passed through to reach that point. Opacity or transparency is a measure of how much energy is absorbed by a certain thickness of material. Larger opacities result in larger drops in the transmittance curve as more opaque material permits less energy to pass through than less opaque material.

In general, transmittance T at a sample point s with opacity $\alpha_s$ may be given by the following recursive function:

$T(s)=T(s-1)-T(s-1)\cdot\alpha_s$ where $T(0)=1$.

Two different models are illustrated in FIG. 5. In the first model, a discrete transmittance curve 200 represents transmittance as a series of steps. The steps correspond to discrete point samples. In the second model, which is the model used in the present embodiment, an interval transmittance curve 202 represents transmittance as a set of intervals each having a respective exponential fall-off across the width of the interval.

The interval transmittance curve may provide a better model of transmittance with depth than a discrete transmittance. In particular, the interval transmittance curve may provide a better model of a continuous material such as tissue.

Methods such as Adaptive Transparency may be adapted for rendering of polygons. In the rendering of polygons, fragments of the polygons may each have a discrete extent in space. In contrast, medical imaging data may typically comprise values that are sampled representations of a space that is filled with continuous tissue.

At stage 130, the ray-casting circuitry 64 determines whether the interval A-buffer is full. In the case of the first interval, the interval A-buffer is not full. The method proceeds to stage 140.

At stage 140, the ray-casting circuitry 64 adds the current interval (which in the first instance of stage 140 is the first interval) to the interval A-buffer by adding the values for the interval parameters for the current interval to the A-buffer. In the present embodiment, the ray-casting circuitry 64 adds the interval to the A-buffer by storing values for the interval's R, G, B, opacity, depth and width to the A-buffer.

At stage 142, the ray-casting circuitry 64 asks whether the ray is finished. Any appropriate measure or measures may be used to determine whether the ray is finished. For example, the ray may be considered to have finished if the ray has passed through a full extent of the first volumetric data set. The ray may be considered to have finished if a predetermined condition has been met, for example if a predetermined value of opacity has been reached.

If the ray is not finished, the ray-casting circuitry 64 returns to stage 124 and steps to a next sample position on the ray. The ray-casting circuitry 64 samples the volumetric data set at the next sample position at stage 126 and determines interval parameters for a next interval at 128. The next interval is between the next sample point and its preceding sample point.

At stage 130, the ray-casting circuitry 64 determines whether the interval A-buffer is full. Consider the case in which the interval A-buffer holds 10 entries. For each of the first 10 intervals, the ray-casting circuitry 64 determines at stage 130 that the interval A-buffer is not full. The ray-casting circuitry then the current interval in the interval A-buffer at stage 140. If the ray is not determined to be finished at stage 142, the ray-casting circuitry 64 returns to stage 124.

In the case of the 11th interval, the ray-casting circuitry 64 determines at stage 130 that the interval A-buffer is full. The ray-casting circuitry 64 proceeds to stage 132.

At stage 132, the combining circuitry 66 compares the intervals that are stored in the interval A-buffer to determine which of the intervals provides the least contribution to the ray. At stage 134, the combining circuitry 66 combines the least-contributing interval with a neighboring interval. Any suitable method of combining may be used. In the present embodiment, non-overlapping intervals are combined by alpha compositing. Specific methods of combining intervals are described below with reference to FIGS. 6, 7A, 7B, 8A, 8B and 8C.

At stage 136, the combining circuitry 66 removes the least-contributing interval and its neighboring interval from the interval A-buffer, and adds the combined interval to the interval A-buffer. In the present embodiment, the combining circuitry removes the interval parameters of the least-contributing interval and its neighboring interval from the interval A-buffer, and replaces them with the interval parameters for the combined interval.

The combining circuitry 66 has made space for the combined interval in the interval A-buffer by combining the least-contributing interval that was previously held in the interval A-buffer with its neighboring interval.

In the present embodiment, the least-contributing interval is selected from the intervals that are already held in the interval A-buffer. In other embodiments, the combining circuitry 66 may also include in its comparison of intervals the interval function that has just been determined at stage 128. If the interval function that has just been determined is determined to be the least-contributing interval, it may be combined with one of the intervals that is already present in the interval A-buffer.

After stage 140, the ray-casting circuitry 64 proceeds to stage 142 and determines whether the ray is finished. If the ray is not finished, the ray-casting circuitry 64 returns to stage 124 and steps to a next position on the ray. If the ray is finished, the ray-casting circuitry 64 proceeds to stage 144 at which the ray is determined to be terminated. Stage 144 concludes an instance of stage 120.

An output of stage 120 is a set of interval parameters which are stored the interval A-buffer. For example, parameter values for 10 intervals may be stored in the interval A-buffers. The 10 stored intervals may have been obtained by combining a large number of intervals in the ray, for example, hundreds of intervals obtained by sampling hundreds of sample points along the ray.

In the present embodiment, each interval is stored in the interval A-buffer by storing a set of interval parameters for the interval, the interval parameters comprising R, G, B, A, width and depth. In other embodiments, any suitable parameters may be used to parameterize the interval. In further embodiments, any suitable representation of the interval function for the interval may be stored in the interval A-buffer. The interval function may be any suitable continuous function representing a change in transmittance across the interval, or a change in any other suitable parameter or parameters across the interval.

Stage 120 is performed for each of a plurality of rays to be cast in the first volumetric data set. In the present embodiment, the plurality of rays correspond to a plurality of pixels of an image to be rendered. Each ray has a corresponding interval A-buffer which is used to store parameter values for a number of intervals (for example, 10 intervals) for that ray. The interval A-buffer has a buffer allocation in memory, which comprises a fixed amount of memory that can be used for that interval. The interval A-buffers may be stored in a larger, whole-image buffer.

A first instance of stage 110 is completed when stage 120 has been performed for every ray in the first volumetric data set.

Stage 120 is then repeated for the second volumetric data set. In the present embodiment, the second volumetric data set is a contrast CT data set. The rays cast in the second volumetric data set follow the same paths as the rays case in the first volumetric data set. The ray-casting for the second volumetric data set is performed at a different time from the ray-casting for the first volumetric data set.

In the present embodiment, intervals obtained for a ray in the second volumetric data set are initially stored in a different interval A-buffer in memory 69 from the intervals obtained for the ray that follows the same path in the first volumetric data set. The intervals for the ray in the first volumetric data set and the intervals for the same ray in the second data set are then combined in a single interval A-buffer. In other embodiments, intervals for the ray in the second volumetric data set may be added directly to the same interval A-buffer as was used for the same ray in the first volumetric data set.

Once stage 110 has been performed for every volumetric data set (in this case, the first volumetric data set and the second volumetric data set), the rendering circuitry 68 proceeds to stage 150. At stage 150, all of the intervals in the interval A-buffer for each ray are composited to obtain a respective pixel color for that ray. The intervals that are composited together include intervals from the first volumetric data set and intervals from the second volumetric data set. Some of the intervals may partially or fully overlap in space.

Methods of compositing are described below with reference to FIGS. 6, 7A, 7B, 8A, 8B and 8C. FIGS. 8A, 8B and 8C illustrate a compositing of partially overlapping images.

The resulting pixel colors for each of the rays are used to display a rendered fusion image on display screen 56. In other embodiments, the rendered fusion image may be displayed on any suitable display device. In further embodiments, the rendered fusion image may not be displayed, or may not be displayed immediately. For example, the rendered fusion image may be stored to a data store.

At stage 152, the rendering is complete.

The method of FIG. 4 provides a deferred compositing method of rendering. Intervals are stored in an interval A-buffer for later compositing. Storing the intervals allows ray-casting to be performed on each volumetric data set asynchronously, which may reduce memory bandwidth requirements.

By storing values for intervals in an A-buffer, the volumetric data sets need not be sampled synchronously. The processing resources used to perform the rendering process may be reduced when compared with a method in which all volumetric data sets are sampled synchronously.

Storing intervals in an A-buffer may allow changes to be made to an image in post-processing without a full re-rendering being performed. For example, consider the case in which a user has viewed a fusion image, and now wishes to view an image showing data from only one of the volumetric data sets used to form the fusion image. Intervals from any other volumetric data set may be removed from the interval A-buffer and a new image may be formed by compositing intervals from only the desired volumetric data set. It may not be necessary to repeat the ray-casting in order to remove or add information from a given a volumetric data to the rendered image.

By combining intervals during the ray-casting, fixed-length interval buffers may be used, thus reducing memory requirements when compared to a conventional unbounded A-buffer.

Figure 6:
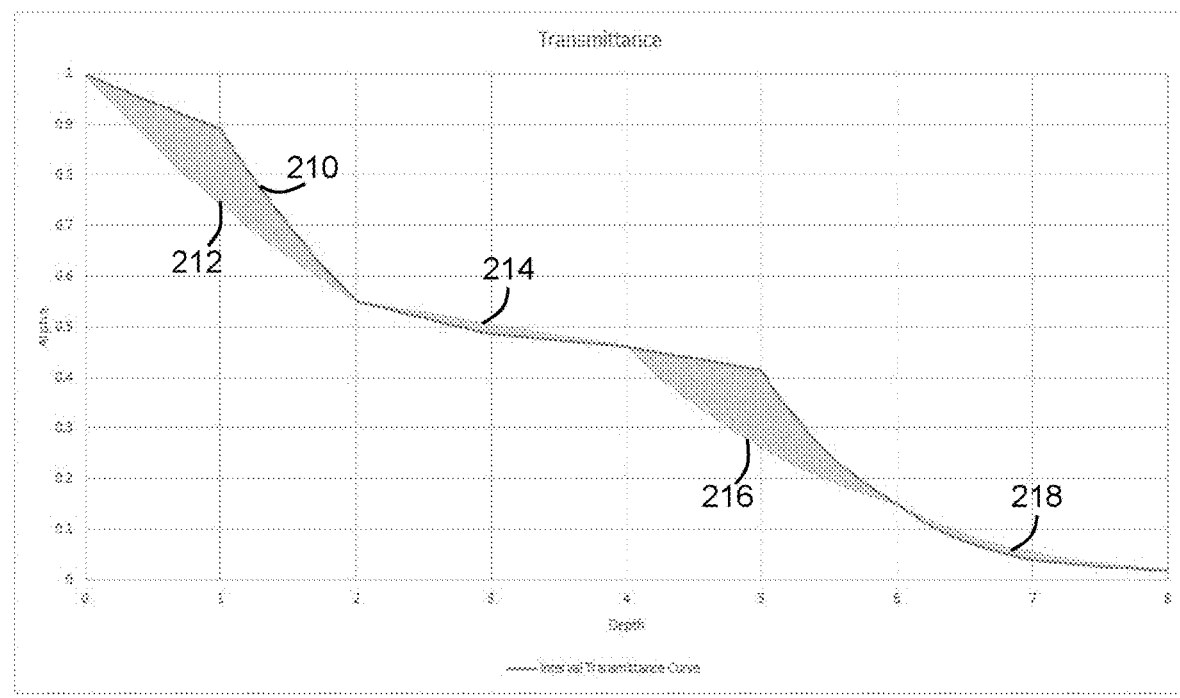
FIG. 6 is a plot of transmittance versus depth, showing a change in area from removing different samples.

FIG. 6 is a plot illustrating an interval transmittance curve 210 comprising a plurality of intervals. A method of determining a least-contributing interval is now described with reference to FIG. 6.

In the example shown in FIG. 6, each interval has a depth of 1 unit. Each interval connects a sample point with an immediately following sample point. The intervals for sample points 0 to 8 are shown in FIG. 6. A transmittance across each interval is modelled using a continuous interval function as described above.

The least contributing interval is taken to be the interval which, if combined with a neighboring interval, would cause the least change in the area under the graph.

FIG. 6 shows examples of changes in area under the graph that would occur if each of the odd-numbered samples were to be removed. The removal of samples is by early compositing of intervals. Since the intervals in FIG. 6 do not overlap, intervals may be combined by using the under operator. A first interval having color $RGB_{s1}$ and opacity $\alpha_1$ and a second interval having color $RGB_{s2}$ and opacity $\alpha_2$ may be combined to obtain a composited interval having color $RGB_c$ and opacity $\alpha_c$ as follows:

$$RGB_c = \frac{RGB_1 + RGB_2 \cdot (1 - \alpha_1)}{\alpha_1 + \alpha_2 \cdot (1 - \alpha_1)}$$

$$\alpha_c = \alpha_1 + \alpha_2 \cdot (1 - \alpha_1)$$

A width of the combined interval is the sum of the width of the first interval and the width of the second interval.

A method of combining overlapping intervals is described below in relation to FIGS. 8A to 8C.

In FIG. 6, a first change in area 212 results from removing the sample point at a depth of 1. Line 210 includes a first interval between depth=0 and depth=1, and a second interval between depth=1 and depth=2. The intervals between depth=0 and depth=1 and between depth=1 and depth=2 are combined.

A second change in area 214 results from removing the sample point at depth=3 by combining an interval between depth=2 and depth=3 with an interval between depth=3 and depth=4.

A third change in area 216 results from removing the sample point at depth=5 by combining an interval between depth=4 and depth5 with an interval between depth=5 and depth=6.

A fourth change in area 218 results from removing the sample point at depth=7 by combining an interval between depth=6 and depth=7 with an interval between depth=7 and depth=8.

It may be seen from FIG. 6 that early compositing of the samples at depth=3 or depth=7 has a much smaller impact on the area of the curve than early compositing of the sample at depth=1.

Comparing interval functions may give a different result than comparing discrete steps, for example using a method as described in Marco Salvi, Jefferson Montgomery, Aaron E Lefohn, Adaptive transparency, HPG '11: Proceedings of the ACM SIGGRAPH Symposium on High Performance Graphics, August 2011, Pages 119-126.

A decision on which of the intervals to collapse together is based on a potential change in area. However, it is not the area of a step-wise graph that are considered. Instead it is the area of a falloff graph comprising continuous functions for intervals. The falloff graph may be considered to be a true falloff graph.

The use of continuous functions may be more likely to produce a correct assessment of the least contribution than a method of selecting a least contribution point that uses a step-wise graph.

Figure 7A:
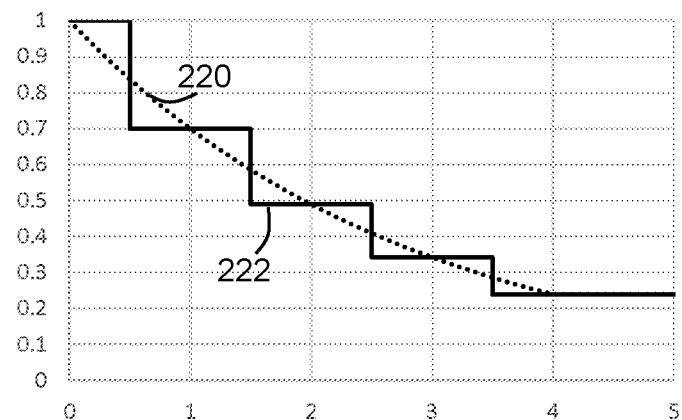
FIG. 7A is a plot of transmittance versus depth, showing four intervals.
Figure 7B:
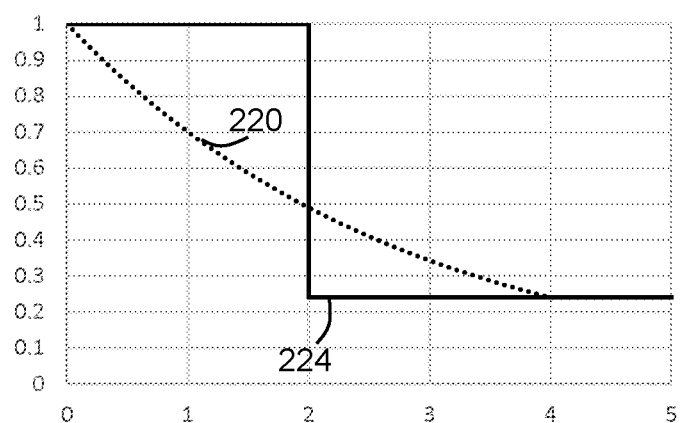
FIG. 7B is a plot of transmittance versus depth, showing one interval obtained by combining the four intervals of FIG. 7A.
Figure 8A:
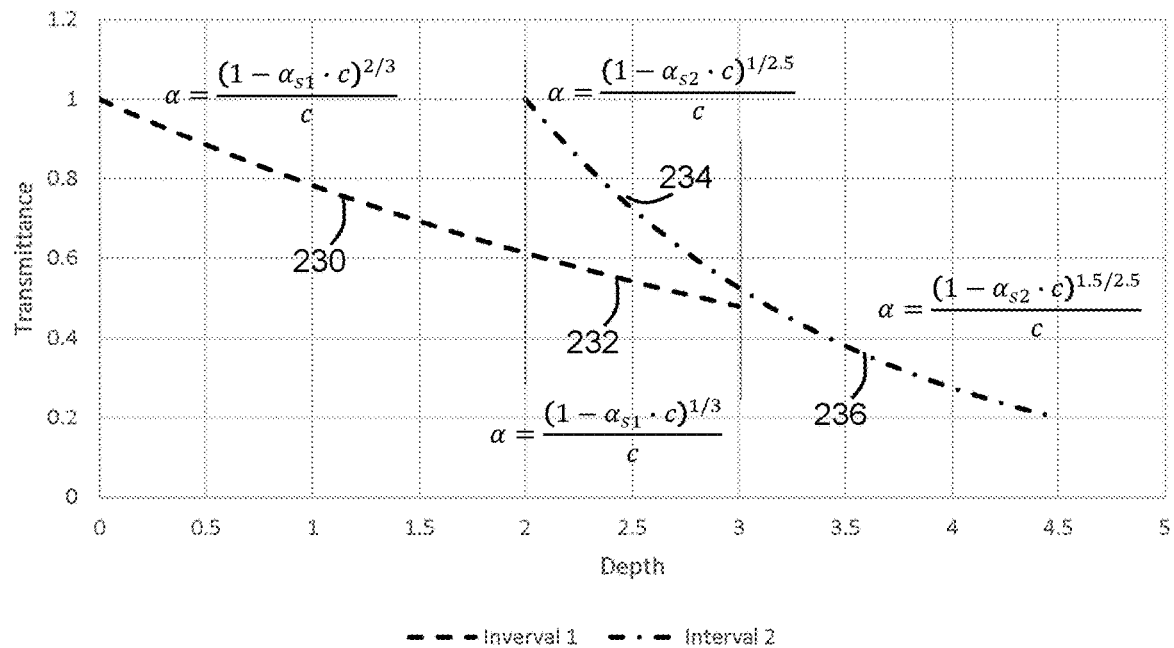
FIG. 8A is a plot of transmittance versus depth, showing two overlapping intervals.
Figure 8B:
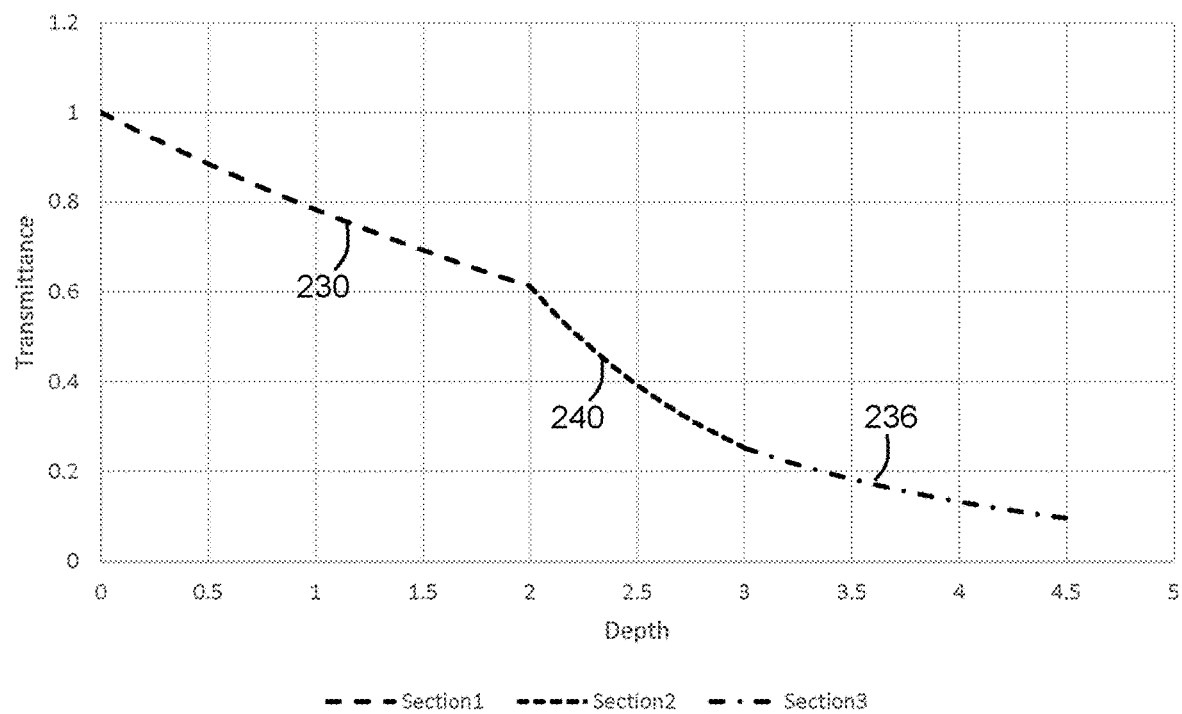
FIG. 8B is a plot of transmittance versus depth, showing a combination of overlapping sections of the intervals of FIG. 8A.
Figure 8C:
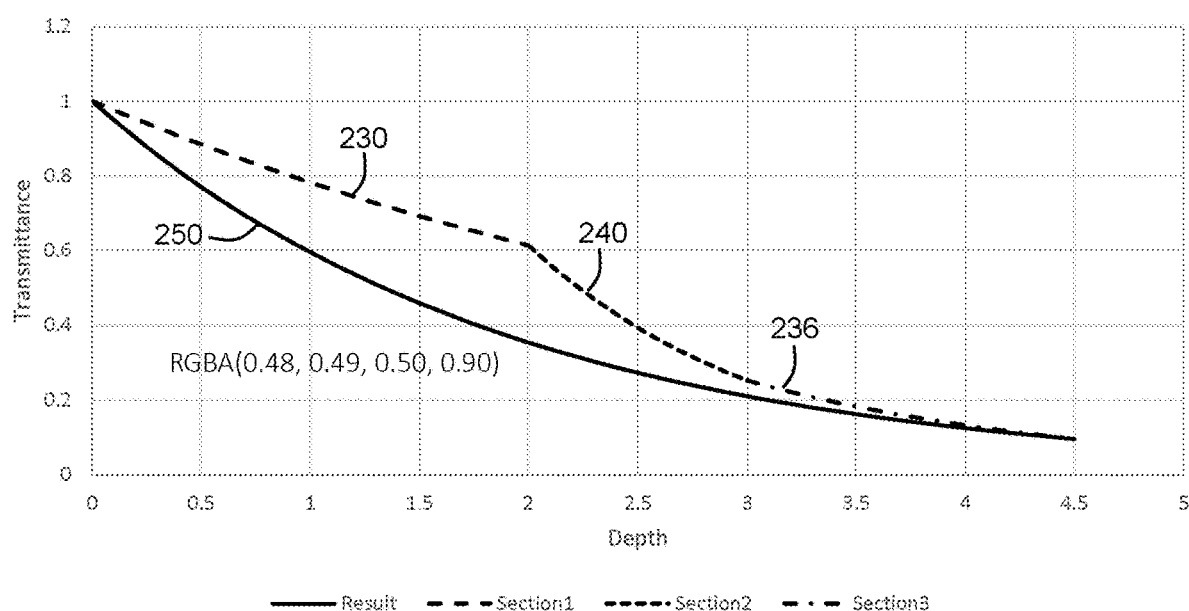
FIG. 8C is a plot of transmittance versus depth, showing a combination of all sections of the intervals of FIG. 8A.

FIGS. 7A and 7B show plots of transmittance against depth. The plots of FIGS. 7A and 7B demonstrate that by combining intervals that are represented using interval functions have an exponential fall-off as described above, a representation of a region of homogeneous material may be compressed into a composite interval without any loss of information. The transmission curve for the homogeneous regions stays the same whether the homogeneous region is represented by a plurality of intervals or by a single combined interval.

In FIG. 7A, the stored fragments for four intervals have depth, width and opacity as shown in Table 1 below:

TABLE 1

| Depth | Width | Opacity |
| --- | --- | --- |
| 0 | 1 | 0.3 |
| 1 | 1 | 0.3 |
| 2 | 1 | 0.3 |
| 3 | 1 | 0.3 |

FIG. 7A shows a transmittance curve 220 for the four intervals. FIG. 7A also shows a step-wise graph 222 that could be obtained for the same four intervals.

FIG. 7B shows a result of combining the four intervals of FIG. 7A into a single interval. The four intervals of Table 1 are combined into a single interval using the under operator as described above. Parameters for the combined single interval are listed in Table 2.

TABLE 2

| Depth | Width | Opacity |
| --- | --- | --- |
| 0 | 4 | 0.7599 |

There is no change in transmittance curve 220, whether it is obtained from the four intervals of Table 1 or the single interval of Table 2.

In FIG. 7B, the four steps of graph 222 are combined into a single step 224.

It may be seen from FIGS. 7A and 7B that the use of continuous intervals may allow intervals to be combined without loss of information. Depth ordering may be improved. For example, the combining of discrete steps may cause fragments to move forward in space when they are combined. The addition of further fragments may then result in errors in ordering. For example, consider the case in which a first fragment is combined with a second fragment. The first fragment moves forward to the position of the second fragment. A third fragment is then added which has a position between the original position of the first fragment, and the position of the second fragment. If the fragments had not been combined, the third fragment would be in front of the second fragment. However, the combination results in the third fragment being behind the combined first fragment and second fragment. Such ordering errors may result in rendering that has visible rendering errors. In some circumstances, changing an order in which fusion volumes are added to a defined composition buffer may cause visible difference to the output.

The deferred composition of continuous intervals rather than discrete steps may reduce or eliminate such ordering errors. A rendering output may not depend on an order in which fusion volumes are added. Visually pleasing results may be obtained with a smaller buffer than if deferred composition of discrete steps were to be used.

A method of combining two intervals 210, 220 is illustrated in FIGS. 8A, 8B and 8C. The combining of the interval functions involves more than simple alpha-compositing.

The two intervals are illustrated in FIG. 8A. The two intervals have the parameter values shown in Table 3.

TABLE 3

| R | G | B | A | Depth | Width |
|---|---|---|---|---|---|
| 0.74 | 0.16 | 0.74 | 0.52 | 0 | 3 |
| 0.13 | 0.82 | 0.16 | 0.8 | 2 | 2.5 |

In the present embodiment, the intervals to be combined are divided into overlapping and non-overlapping sections. The first interval comprises two sections 230, 232. The second interval comprises two sections 234, 236.

Using Equation 1, the intervals have accumulated opacities:

$$\alpha_{acc}(u) = \frac{(1 - \alpha_{s1} \cdot c)^{u/6_s}}{c} \text{ for the first interval}$$

$$\alpha_{acc}(u) = \frac{(1 - \alpha_{s2} \cdot c)^{u/6_s}}{c} \text{ for the second interval.}$$

To combine the intervals, the intervals are each divided into overlapping and non-overlapping sections. Colors for the sections are taken from their source intervals (the first and second intervals). Values of opacity for the sections are as listed below.

The first interval is divided into a first section 230 that does not overlap with the second interval, and a second section 232 that overlaps with the second interval. The first interval has a depth of 0 and a width of 3. The first section 230 of the first interval has a depth of 0 and a width of 2. The opacity of the first section 230 of the first interval is given by:

$$\alpha = \frac{(1 - \alpha_{s1} \cdot c)^{2/3}}{c}$$

The second section 232 of the first interval has a depth of 2 and a width of 1. The opacity of the second section 232 of the first interval is given by:

$$\alpha = \frac{(1 - \alpha_{s1} \cdot c)^{1/3}}{c}$$

The second interval has a depth of 2 and a width of 2.5. The second interval is divided into a first section 234 that overlaps with the first interval, and a second section 236 that does not overlap with the first interval.

The first section 234 of the second interval has a depth of 2 and a width of 1. The opacity for the first section 234 of the second interval is given by:

$$\alpha = \frac{(1 - \alpha_{s2} \cdot c)^{1/2.5}}{c}$$

The second section 236 of the second interval has a depth of 3 and a width of 1.5. The opacity for the second section 236 of the second interval is given by:

$$\alpha = \frac{(1 - \alpha_{s2} \cdot c)^{1.5/2.5}}{c}$$

Once two fully overlapping intervals have been obtained, color and opacity for the intervals are combined using the following equations:

$$RGB_{result} = \frac{RGB_{s1} \cdot \alpha_1 + RGB_{s2} \cdot \alpha_2 - (RGB_{s1} \cdot \alpha_1 RGB_{s2} \cdot \alpha_2)}{\alpha_1 + \alpha_2 - (\alpha_1 \cdot \alpha_2)} \quad \text{(Equation 2)}$$

$$\alpha_{result} = (1 - (1 - \alpha_1) \cdot (1 - \alpha_2)) \quad \text{(Equation 3)}$$

In some embodiments, a color of overlapping intervals is combined as a sum of pre-multiplied color contributions of the two intervals. In some embodiments, a color of overlapping intervals is a weighted average of the color contributions of the two intervals.

FIG. 8B shows a result of combining the two intervals illustrated in FIG. 8A. The first section 230 of the first interval is unchanged. The first section 230 of the first intervals has RGBA values of (0.74, 0.16, 0.74, 0.387). The color is the same as the color of the first interval. The opacity is changed to account for the first section only being ⅔ of the length of the first interval.

A combined section 240 occupies the part of the transmittance curve from depth=2 to depth=3. The RGBA values of the combined section 240 are obtained using Equation 2 and Equation 3 above to combine RGB and opacity of the second section 232 of the first interval and the first section 234 of the second interval. The resulting RGBA values are (0.36, 0.70, 0.38, 0.59). The color of the combined interval is therefore a combination of the color of the first interval and a color of the second interval.

The second section 236 of the second interval is unchanged and has RGBA values of (0.13, 0.82, 0.16, 0.62).

FIG. 8C illustrates a compositing of the resulting three non-overlapping intervals 230, 240, 236 of FIG. 8B using an alpha composite. The three non-overlapping intervals 230, 240, 236 are combined using the under operator.

Interval 250 as illustrated in FIG. 8C is obtained by combining the three non-overlapping intervals 230, 240, 236.

In some embodiments, the combined interval 240 may be stored in place of the three non-overlapping intervals 230, 240, 236. Alternatively, the three non-overlapping intervals 230, 240, 236 may be stored to retain fidelity.

In the embodiment of FIGS. 8A to 8C, it is assumed that the color and opacity of an interval are consistent over the interval. In other embodiments, color may be changed over an interval rather than maintaining a single color. Equations for combining intervals may be changed accordingly.

The method described above with reference to FIG. 4 may provide improved visual quality with significantly fewer entries per pixel in cases where volumes exhibit significant overlap. For example, a method using an interval-DCB (deferred compositing buffer) having 8 entries may provide rendering having better visual quality than a method using a point-DCB having 32 entries.

Storing intervals in an A-buffer may provide an improved representation when compared with storing points in an A-buffer. Typically, A-buffers may be designed fro use with polygons and have the expectation of point samples, with point colors and point opacities. Volume rendering works with voxels and computes the integral of a continuous function rather than a set of points. When inserting a fragment between two existing fragments, a point sample system may exhibit a mismatch when compared with a hypothetical continuous function. For example, if a point is added in the middle of an existing set of point samples, a shape of a resulting transmittance curve may not match well with a theoretical ideal transmittance curve. A representation of intervals using continuous functions as described above may provide a better match to a theoretical ideal transmittance curve.

Figure 9A:
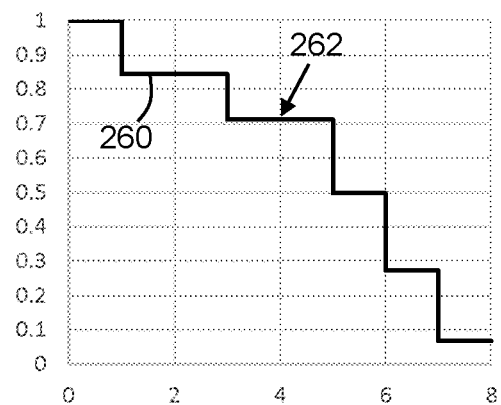
FIG. 9A shows a transmittance curve comprising a set of steps.
Figure 9B:
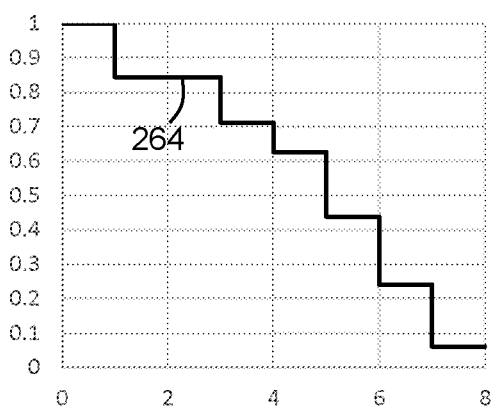
FIG. 9B shows the transmittance curve of FIG. 9A once a new sample is added.
Figure 9C:
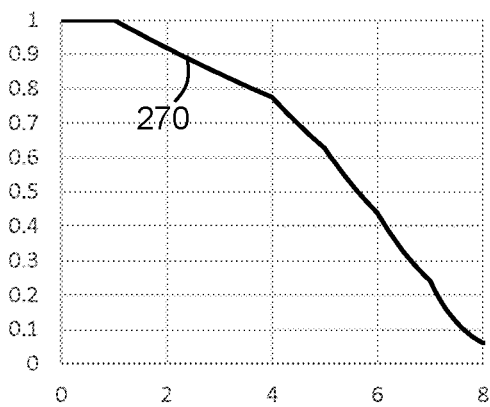
FIG. 9C shows a theoretical ideal transmittance curve.

FIG. 9A shows a transmittance curve 260 for set of steps for an existing set of samples. FIG. 9A also indicates a point 262 at which a new sample is to be added. FIG. 9B shows a new transmittance curve 264 including the new sample. FIG. 9C shows a theoretical ideal transmittance curve 270. The transmittance curve 264 does not match well with the theoretical ideal transmittance curve 264.

In embodiments described above, the processing circuitry traverses fusion volumes independently. For each volume, the processing circuitry stores sample intervals (start depth, depth extent, color and alpha) into an A-buffer, which may also be called a deferred composition buffer or DCB. If the deferred composition buffer is full, the least important interval is composited in place, with consideration for overlapping intervals. Once all volumes have been added to the DCB, remaining intervals are composited to form an interval, using the same process as the composite-in-place operation.

In other embodiments, a method of interval compositing as described above may be used to combine intervals for rendering an image from a single volumetric data set. The use of intervals as described above rather than a stepped transmittance function may provide improved rendering performance.

In further embodiments, image fusion may be performed on any suitable number of volumetric data sets. The volumetric data sets may be acquired using any suitable modality or modalities. For example, a first volumetric data set may comprise T1-weighted MR data and a second volumetric data set may comprise T2-weighted data. A first volumetric data set may comprise CT data and a second volumetric data set may comprise PET data. One or more of the volumetric data sets may be acquired using functional imaging.

In some embodiments, a set of discrete fragments may be added to the fragments to be rendered, along with the stored intervals. The discrete fragments may be discrete point samples along a path. The discrete fragments may result from, for example, polygonal modelling or mesh modelling. The discrete fragments may be representative of at least one polygon and/or at least one manifold. The discrete fragments may be stored in the same buffer as the intervals, and may be composited together with the intervals. Rendering may therefore be performed of mixed types of data. Rendering of mixed types of data may be useful when, for example, a computer-generated model of an implant or medical device is to be combined with data obtained from medical imaging of a subject. The computer-generated model may comprise polygons and/or manifolds. In some circumstances, the computer-generated model may be added to a rendering of the medical imaging data without having to perform a full re-rendering.

In embodiments above, deferred compositing of intervals is used for rendering. In other embodiments, deferred compositing methods as described above may be used to composite intervals for any purpose. The purpose may not be rendering.

For example, in some embodiments, photon mapping is performed for a plurality of paths through a volumetric data set. For each of the paths, parameter values for a set of intervals along the path are determined. Some of the intervals may be composited-in-place during the photon mapping. Deferred compositing of intervals along each path may be performed.

In embodiments described above, the volumetric image data sets comprise medical image data, for example CT data. In other embodiments, the volumetric image data sets may comprise any suitable form or forms of medical image data, for example CT data, MR data, X-ray data, PET data, or SPECT data. The volumetric image data sets may be obtained by imaging any suitable anatomical region of any patient or other subject, using any suitable imaging modality or modalities. The patient or other subject may be human or animal.

In further embodiments, the volumetric image data sets may comprise any form of image data, which may not be medical.

Certain embodiments provide a method for visualization of multiple sets of volume data where a set of rays are projected through each volume in series, and where at each step of the ray, a integral interval is added to a buffer storing color, depth, depth extent, and alpha where, if there is insufficient space in the buffer to store said interval, the least contributing interval is combined composited into its neighbor and the freed memory is used to store the interval to be added.

The composition of intervals may be conducted with consideration to overlap of the intervals in depth space, and where the color is a sum of the pre-multiplied color contributions of the two overlapping intervals.

The composition of intervals may be conducted with consideration to overlap of the intervals in depth space. The resulting color may be a weighted average of the color contributions of the two overlapping intervals.

The volume data may be gathered from a CT, MRI or other medical imaging device.

Each individual volume may instead be added to its own buffer. The buffers may then be combined together at the end of the render.

The renderer used may compute a shaded volume view of the source data.

The renderer used may computes a global illumination volume view of the source data.

Intervals being added to the buffer may optionally be instead combined into one of the existing intervals present in the buffer.

Certain embodiments provide a medical image processing apparatus comprising a buffer and a processing circuitry configured to: acquire volume data for a rendering image, calculate, regarding to the volume data, a plurality of data in accordance with a depth from the reference position which is based on gaze position of the rendering image, determine a continuous function indicating a transparency by the depth based on the plurality of the data, store the continuous function to the buffer, generate a rendered image based on the continuous function.

The processing circuitry may be further configured to calculate a discrete data based function indicating the transparency by the depth based on the plurality of the data, determine the continuous function by fitting the discrete data based function.

Certain embodiments provide a method of rendering an image representing a volume from a plurality of set of volumetric image data each representing the volume, the method comprising: for each of the sets of volumetric imaging data, performing a respective ray-casting process that comprises projecting a plurality of rays through the volume and obtaining image-related parameter values at a series of steps through each ray; maintaining buffers storing data representing values of the image-related parameters; using values from the buffers for the plurality of volumetric data sets to produce a rendered image representing the volume; wherein the data representing values of the image-related parameters comprises interval data that represent variation of value as a function of position between each step.

The interval data may comprise continuous functions.

The method may comprise, in response to the buffer being full or almost full, combining two or more of the interval data and storing the resulting combined interval data in the buffer in place of said two or more of the interval data.

The combining process may comprise, for intervals to be combined, dividing the intervals into overlapping and non-overlapping sections, performing a first combining process in respect of the overlapping sections and a second, different combining process in respect of the non-overlapping sections.

For at least the overlapping interval sections, the combining process may comprise a summing of pre-multiplied color contributions, or the combining process may comprise a weighted averaging of color contributions.

The overlapping sections may be sections that overlap in depth space.

The combining process(es) may comprise compositing process(es).

The method may comprise selecting the two or more of the interval data to be combined in dependence on potential loss of information.

The buffers may comprise deferred composition buffers or A-buffers.

The image-related parameters may comprise one or more of depth, start depth, depth range, color, alpha value, transparency.

The ray-casting processes may be performed for each set of volumetric imaging data in turn.

The volumetric imaging data may comprise medical imaging data, optionally CT or MRI data.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image processing apparatus comprising:
a buffer; and
processing circuitry configured to:
obtain a volumetric image data set;
determine, from the volumetric image data set, a plurality of intervals along a path through the volumetric image data set, each interval of the plurality of intervals having a respective depth from a reference position of the path;
for each of the plurality of intervals, determine respective parameter values of a respective continuous function representative of a transparency of each of the plurality of intervals;
combine two or more of the plurality of intervals to obtain a combined interval,
store the respective parameter values for the combined interval in the buffer in place of the respective parameter values for the two or more of the plurality of intervals;
store to the buffer the respective parameter values for the continuous functions corresponding to the plurality of intervals other than the two or more of the plurality of intervals; and
generate a rendered image using the stored parameter values for the continuous functions.

2. The medical image processing apparatus according to claim 1, wherein the using of the stored parameter values for the continuous functions comprises using the stored parameter values for the continuous functions to composite the continuous functions along the path to obtain an overall value for the path.

3. The medical image processing apparatus according to claim 2, wherein the reference position is based on a gaze position for rendering of the rendered image, and the overall value comprises a pixel color value.

4. The medical image processing apparatus according to claim 2, wherein the compositing comprises deferred compositing, the deferred compositing being performed after the respective parameter values for the each of the plurality of intervals have been obtained and stored.

5. The medical image processing apparatus according to claim 2, wherein the volumetric image data set is a first volumetric image data set and the processing circuitry is further configured to:
obtain a further volumetric image data set;
determine, from the further volumetric image data set, a further plurality of intervals along a further path through the further volumetric image data set, each further interval of the further plurality of intervals having a respective depth from a reference position of the further path, wherein the further path through the further volumetric image data set corresponds to the path through the first volumetric image data set;

for each of the further plurality of intervals along the further path through the further volumetric image data set, determine respective parameter values of a respective continuous function representative of a transparency of each of the further plurality of intervals; and store the respective parameter values for the further volumetric image data set to the buffer and/or to at least one further buffer;

wherein the compositing of the continuous functions along the path through the first volumetric image data set comprises using the stored parameter values for the continuous functions for the first volumetric image data set to composite the continuous functions for the first volumetric image data set with the continuous functions for the further volumetric image data set.

6. The medical image processing apparatus according to claim 5, wherein the rendered image comprises or is representative of information from the first volumetric image data set and information from the further volumetric image data set.

7. The medical image processing apparatus according to claim 5, wherein the stored parameter values for the continuous functions of the first volumetric image data set and the stored parameter values for the continuous functions of the further volumetric image data set are determined in series.

8. The medical image processing apparatus according to claim 5, wherein the first volumetric image data set comprises data acquired using a first imaging modality, and wherein the further volumetric image data set comprises data acquired using a second, different imaging modality.

9. The medical image processing apparatus according to claim 2, wherein the processing circuitry is further configured to:

acquire a further image data set, the further image data set comprising or representing at least one of a mesh, a polygonal geometry, and a manifold; and store data points obtained from the further image data set to the buffer and/or to a further buffer;

wherein the compositing of the continuous functions along the path comprises compositing data points from the further image data set with the continuous functions from the volumetric image data set.

10. The medical image processing apparatus according to claim 1, wherein the processing circuitry is further configured to:

determine a discrete data based function indicating a transparency at each of a plurality of depths along the path; and determine the continuous functions by fitting to the discrete data based function.

11. The medical image processing apparatus according to claim 1, wherein the stored parameter values for the continuous functions comprise values for color, opacity, depth and depth extent.

12. The medical image processing apparatus according to claim 1, wherein the combining of the two or more of the plurality of intervals comprises using the stored parameter values for the continuous functions to composite the continuous functions for the two or more of the plurality of intervals.

13. The medical image processing apparatus according to claim 1, wherein the processing circuitry is further configured to select the two or more of the plurality of intervals based on relative contributions of each of the plurality of intervals to an overall value for the path.

14. The medical image processing apparatus according to claim 1, wherein the combining is in response to the buffer being full or nearly full.

15. The medical image processing apparatus according to claim 1, wherein the combining comprises determining at least one overlap region in which a section of a first one of the two or more of the plurality of intervals overlaps a section of a second one of the two or more of the plurality of intervals, and performing a combining process to combine the overlapping sections.

16. The medical image processing apparatus according to claim 15, wherein the combining process comprises at least one of (1) a summing of pre-multiplied color contributions of the overlapping sections and (2) a weighted averaging of color contributions of the overlapping sections.

17. The medical image processing apparatus according to claim 1, wherein the processing circuitry is further configured to:

determine, from the volumetric image data set, a further plurality of intervals along a plurality of further paths through the volumetric image data set;

for each of the further plurality of intervals along the further paths, determine respective parameter values of a respective continuous function representative of a transparency of each of the further plurality of intervals; and store the respective parameter values for the further plurality of paths to the buffer and/or to at least one further buffer;

wherein the generating of the rendered image comprises using the stored parameter values for the continuous functions for the path and the stored parameter values for the further plurality of paths.

18. The medical image processing apparatus according to claim 1, wherein the generating of the rendered image comprises using the stored parameter values for the continuous functions to perform photon mapping to obtain an irradiance volume, and generating the rendered image using the irradiance volume.

19. The medical image processing apparatus according to claim 1, wherein the volumetric image data set comprises at least one of computed tomography (CT) data, magnetic resonance (MR) data, X-ray data, positron emission tomography (PET) data, and single photon emission computed tomography (SPECT) data.

20. A medical image processing method comprising:

obtaining a volumetric image data set;

determining, from the volumetric image data set, a plurality of intervals along a path through the volumetric image data set, each interval of the plurality of intervals having a respective depth from a reference position of the path;

for each of the plurality of intervals, determining respective parameter values of a respective continuous function representative of a transparency of each of the plurality of intervals;

combining two or more of the plurality of intervals to obtain a combined interval, storing the respective parameter values for the combined interval in a buffer in place of the respective parameter values for the two or more of the plurality of intervals;

storing to the buffer the respective parameter values for the continuous functions corresponding to the plurality of intervals other than the two or more of the plurality of intervals; and generating a rendered image using the stored parameter values for the continuous functions.

\* \* \* \* \*